United States Patent
Olarig et al.

(10) Patent No.: US 6,647,415 B1
(45) Date of Patent: Nov. 11, 2003

(54) DISK STORAGE WITH TRANSPARENT OVERFLOW TO NETWORK STORAGE

(75) Inventors: Sompong P. Olarig, Cypress, TX (US); Michael F. Angelo, Houston, TX (US); Ramkrishna Prakash, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/409,485

(22) Filed: Sep. 30, 1999

(51) Int. Cl.[7] .............................................. G06F 12/00
(52) U.S. Cl. ..................... 709/224; 709/232; 709/238
(58) Field of Search .......................... 707/204; 709/219, 709/240, 214, 235, 224, 232, 238; 711/165; 710/129; 395/600

(56) References Cited

U.S. PATENT DOCUMENTS

| | | | | |
|---|---|---|---|---|
| 4,517,468 A | * | 5/1985 | Kemper et al. ............... 290/52 |
| 5,276,867 A | * | 1/1994 | Kenley et al. .............. 707/204 |
| 5,778,395 A | * | 7/1998 | Whiting et al. ............... 707/10 |
| 5,893,924 A | * | 4/1999 | Vakkalagadda ............... 710/54 |
| 6,269,382 B1 | * | 7/2001 | Cabrera et al. ............. 707/203 |
| 6,304,936 B1 | * | 10/2001 | Sherlock ..................... 370/412 |
| 6,393,470 B1 | * | 5/2002 | Kanevsky et al. .......... 709/211 |

OTHER PUBLICATIONS

"Petal: Distributed Virtual Disks", Lee, Edward K & Thekkath, Chandramohan, ASPLOS 1996 paper, 9 pages.
"Petal: A Scalable Network Storage System Project", Lee Edward & Thekkath, Chandramohan 2 pages, http//www.research.digital.com/src/articles/199701/petal.html.

* cited by examiner

Primary Examiner—David Wiley
Assistant Examiner—April Baugh

(57) ABSTRACT

A computer system and method of operating a network in which data overflow from workstation or PC hard drives is automatically transferred over to a network server hard drive allowing the workstation user to continue working without interruption. Furthermore, this system minimizes the amount of time a network administrator spends on attending to users who have no remaining hard drive space on their computers.

27 Claims, 3 Drawing Sheets

DISK STORAGE WITH TRANSPARENT OVERFLOW TO NETWORK STORAGE

BACKGROUND AND SUMMARY OF THE INVENTION

The present application relates to storage usage in a networked computer system, and particularly to management of available room in storage.

Background: Computer Networks

One problem encountered in network management is the workstation whose storage becomes full. When this happens, the system will not allow the user to proceed with any process which requires additional space in storage, resulting in service calls to the system administrator and unhappy users. Additionally, software often has large storage requirements, which requires users to have large amounts of storage available. Retrofitting more storage units into an existing workstation can be prohibitively costly, particularly for a workstation which is in the last half of its life (which is often the case when a workstation user runs out of storage).

Background: Virtualized Storage

Storage architecture is one of the basic elements of computer system design, and many proposals have suggested various ways to organize and manage data storage. Some proposals have suggested a "virtualized" storage architecture, in which the client's view of storage is separate from the physical resources that are used to implement it. One such proposal is the "Petal" system, described in "Petal: Distributed Virtual Disks" (ASPLOS 1996 paper; see also http://www.research.digital.com/SRC/articles/199701/petal.html) In this system, the user deals with virtual disks which can be created or deleted at will. The actual hardware used consists of a series of servers with nine disks connected to each. The server will use one of the disks for write-ahead capabilities, and the remaining eight to store client data.

Background: Local Area Networks

The appearance of personal computers in the early 1980s created the need for interconnectedness among computer users—to share peripheral devices, to send messages, to share data and access to computing resources. A local area network (LAN) is a network that connects users in a limited geographic area, typically within the same office, department, or building. Unlike mainframe setups, where users are limited to a host-terminal connection, LANs allow users complete interconnection with the personal computer. All devices and peripherals can be shared across a single cabling scheme. Users can connect to different servers as needed, access data or use other computer resources, or share devices that are too expensive to be used by a single user, all through the same physical connection.

Automatic Overflow to Network Storage

The disclosed network system includes a feature which is automatically activated (unless it has been disabled) when a user's local storage becomes full. In this case, some of the data in the local storage are written to network storage, without the user's intervention, to free up space in the local storage. This could slow response time under some circumstances, so it is preferable to make provisions for moving portions of the data which are less used. Various algorithms may be used to define which data are used the least, and thus are to be moved to another location. The administrator may be given the option to choose to alert the user when this is happening, or to let this transaction be totally transparent and invisible to the user.

The disclosed innovations, in various embodiments, provide one or more of at least the following advantages:

allocations are transparent to the end user, so no stoppages are necessary;

system administrators are less likely to be called for lack of space;

facilitates consolidation and effective management of storage space by system administrator;

system storage may be extended without user knowledge.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 4 shows the process without a shortcut hint, and FIG. 5 shows the process when a shortcut hint is used.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Preferred Embodiment

In a presently preferred embodiment, data stored in a personal computer's storage or hard drive is transferred and stored into network storage, thereby freeing up storage for use by the operator of the personal computer. (In the present disclosure, the terms "hard disk" and "hard drive" are used interchangeably to mean any type of electronic, magnetic, optical or mechanical data storage device and are not limited to standard magnetic storage devices as these terms are commonly used. The terms "PC," "workstation," "machine," or "computer" are intended to encompass any machines with similar functionality, including network servers. Palmtop computers, electronic appliances, internet appliances, and any other devices capable of network attachment are within the contemplation of the present invention.)

Note that the ability to transfer data applies to servers on the network as well as PCs or workstations. Data can effectively be stored anywhere on the network, sent from wherever there is little storage to where there is excess storage.

Figure 1:
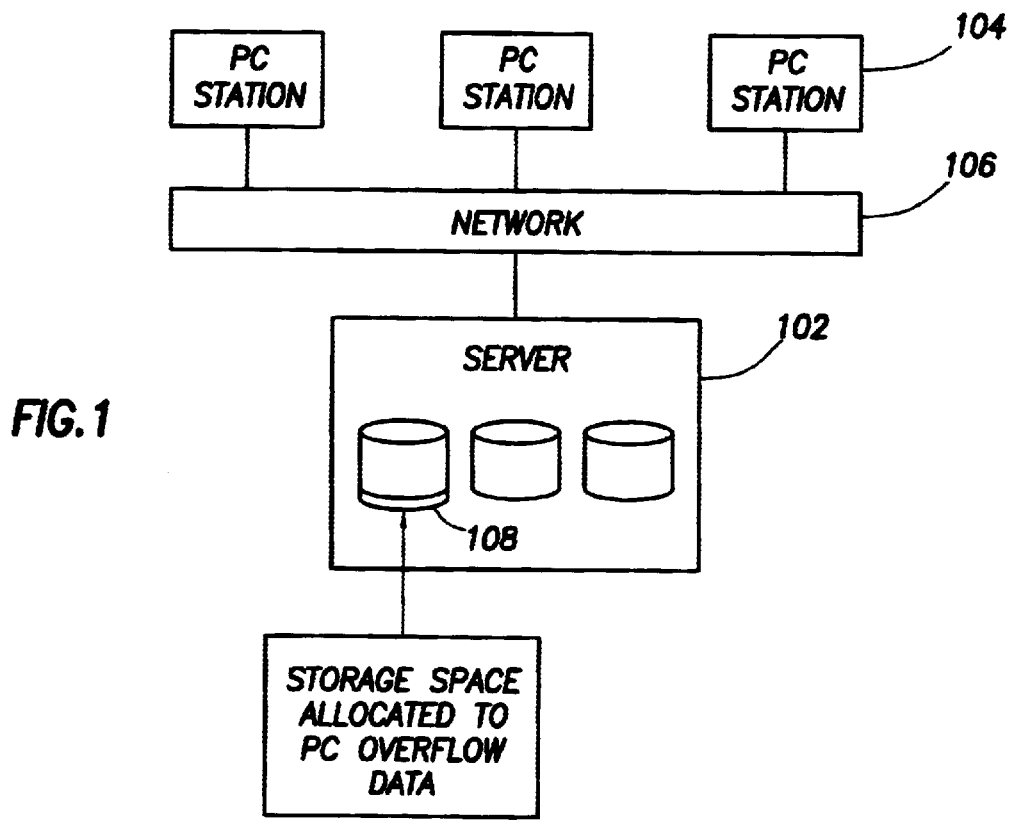
FIG. 1 shows a block diagram of a computer network according to the presently preferred embodiment.

FIG. 1 shows a typical network setup. At least one network server 102 has a plurality of personal computers 104 (PCs) or work stations connected to it by a network connection 106 (e.g., by an ethernet connection) arranged to form a network. The network server has at least a portion of its storage 108 allocated for storing overflow data from the storage of the PCs connected to it.

Figure 2:
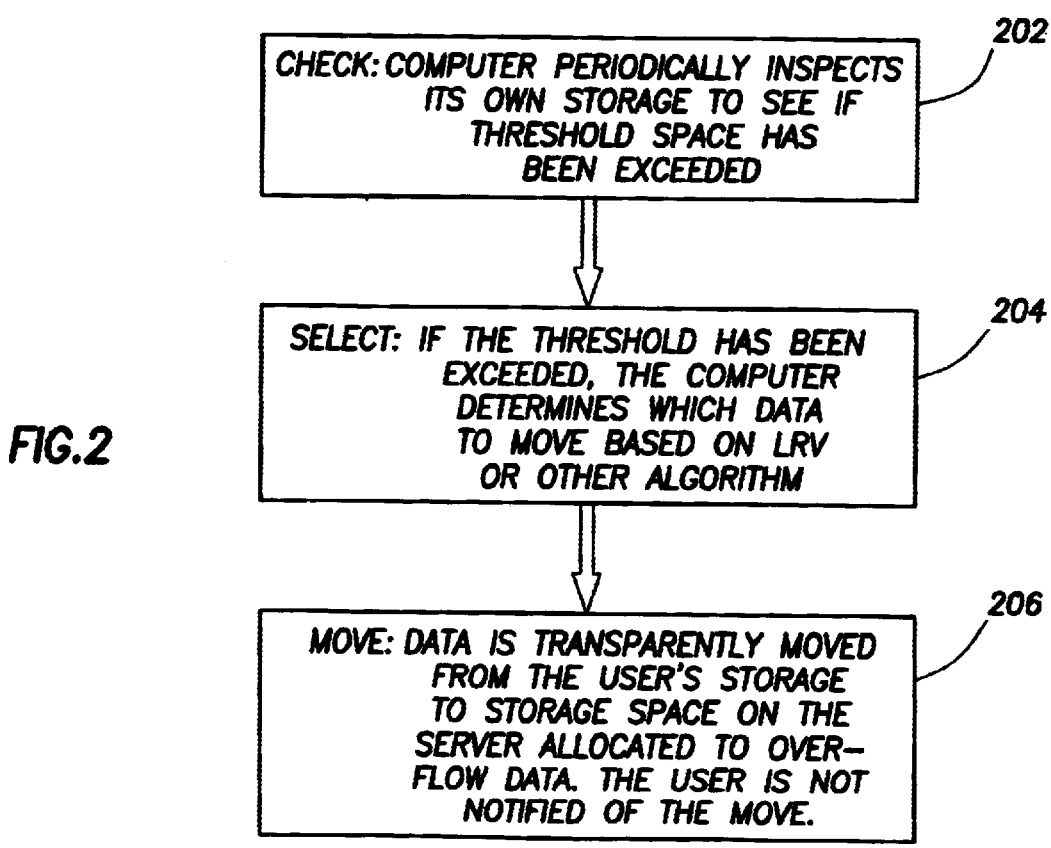
FIG. 2 shows a flowchart of the process of the presently preferred embodiment.

FIG. 2 shows a flow chart of the transparent overflow storage process. Using any of various algorithms, each local workstation or PC periodically inspects the used capacity of its storage to determine whether some of the data stored on the PC needs to be moved to network storage (step 202). If a PC's storage space is nearing full capacity, the PC automatically determines which data has been least-recently used (step 204) and automatically moves such amount of data to the network server's storage so as to free up a previously determined percentage or magnitude of storage space on the PC, without notifying the user (step 206).

Note that the amount of storage in use above the threshold for moving data (i.e., the minimum available storage) need not be the same as the amount of data moved. For example, a computer may be set to move data to network storage when there is less than 5% of storage free. When this threshold is reached, the machine will move enough data so as to free up 10% of storage.

Another option is to have different priorities for when to move data at different.thresholds. For example, the threshold could be set such that when less than 10% of a PC's storage is free, that enough of the least-recently used data is transferred to the network's storage so as to free up 15% of the PC's storage, but this data is not moved until it is convenient for the data to be moved. For example, when the load factor on the machine drops below a specified number of jobs, or when the system is unused for a period of time or prepares to go into a hibernation state, overflow data could be moved. The same machine would also be set so that if the available storage reaches only 5% before data has been moved (i.e., a "convenient" time has not come about), the machine will move the data immediately and not wait for a more convenient time to move the data.

Alternatively, the threshold could be defined in terms other than a percentage of available storage (e.g., when there is less than 5 Megabytes unused). Whatever threshold is chosen, the workstation performs this transfer function automatically without prompting or interaction with the network administrator or the user. The user would still be able to access the data even after transfer, although the speed of access might be slightly reduced (depending on available network bandwidth).

Figure 3B:
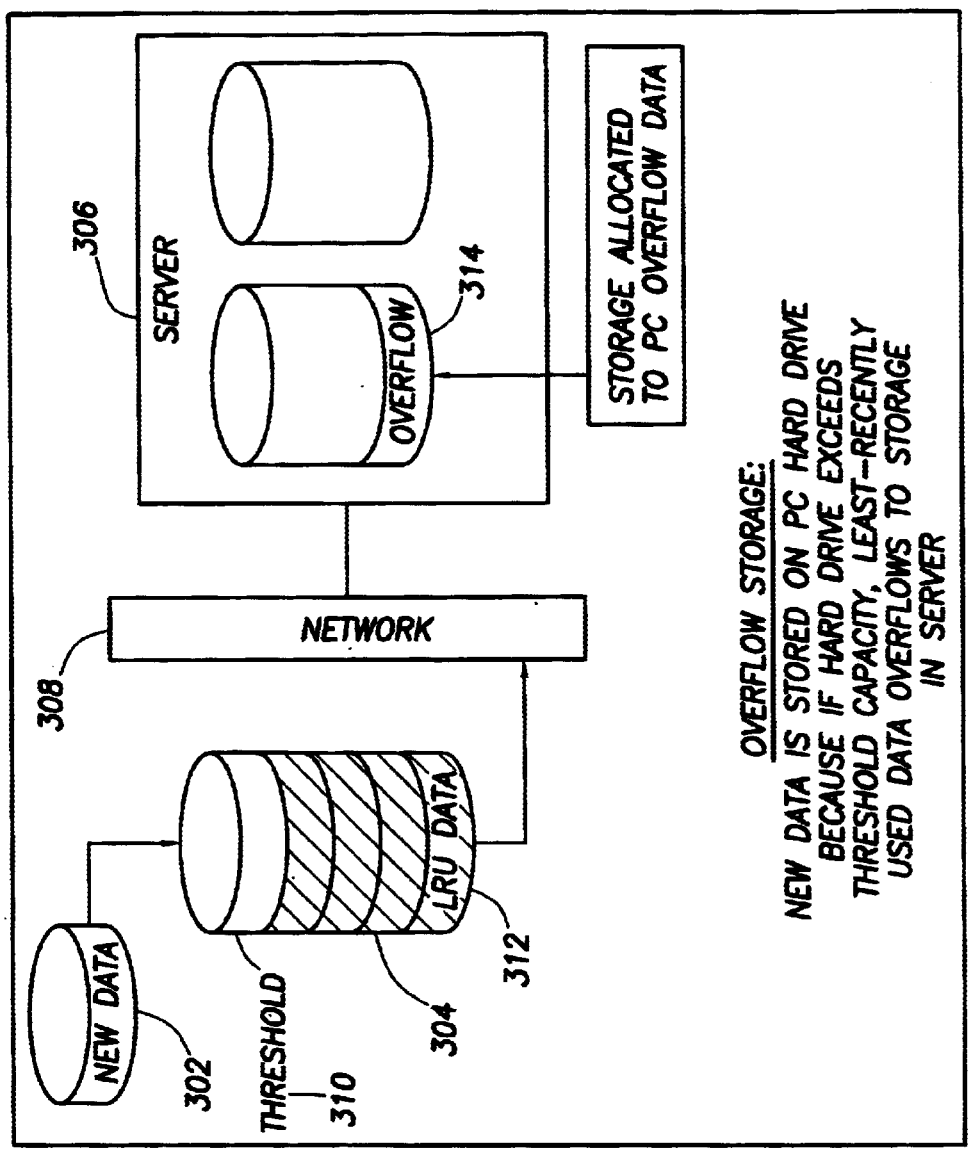
FIGS. 3a and 3b show non-overflow and overflow storage methods, respectively.
Figure 3A:
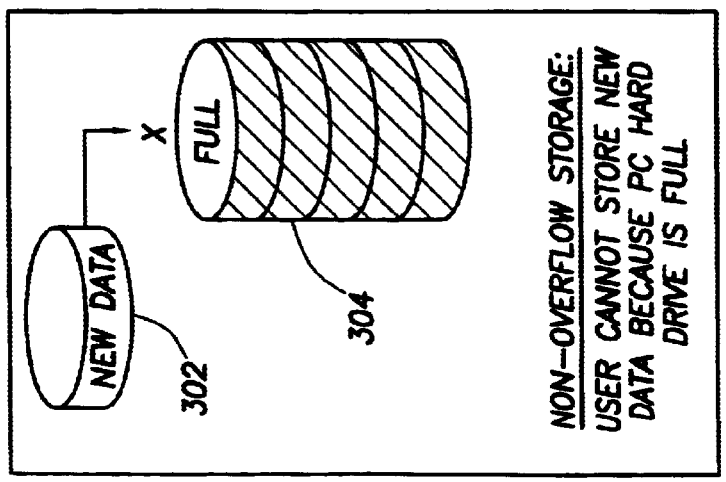

FIGS. 3a and 3b show how overflow storage allows the user access to server storage, as opposed to non-overflow storage wherein the user is limited only to the space on the local PC. In a non-overflow storage system, FIG. 3a, a user attempts to store new data 302 in the user's local storage 304. If the user's local computer has insufficient storage, the user cannot store the new data 302. In a system that allows overflow storage, FIG. 3b, a user is connected to a server 306 through a network 308. The user may store new data 302 in the user's local storage 304, because as the local storage 304 reaches a threshold level 310, the least-recently used data 312 is automatically (and, in the present invention, transparently) moved to the server 306 which has storage 314 allocated to storing overflow data 312 from the user's computer storage 304.

The overflow data stored in remote storage can be protected from deletion. The logical partitions of the remote storage can be locked down via lock bits if the user requests and the network administrator chooses. This way, the user know that data stored in remote storage will still be there, and cannot be evicted. This is useful, for example, when a user plans to replace the drives on a workstation. The user can place the data from the old drive in remote storage, replace the drives, then reload the remotely stored data onto the new drives. The lockdown can be for a predetermined time period, or as long as requested.

Redirecting and Caching

Following is a description of the processes involved when networked computers store overflow data in network storage. Consider two machines, A and B, which are connected to the same network with server S. Normally, machine A will have access to machine B's data, and vice versa. But when machine B has some of its data stored in the server's storage, machine A must have a way to find the data in its new location.

When files from machine B migrate to server storage via transparent overflow, there are basically two variables to consider. First, machine A must be redirected to the new location of the file in some way. Second, the cache location of the file pages must be determined.

First consider the redirecting problem. Assume a file from B migrates to server storage. Machine A will expect to find that file in B's storage, and will check there for the file. Machine A must be directed to the new location of the file in some way. There are two options. In the first option, a redirector is installed on B, indicating where the file has been moved to on the server. When A requests the needed file from B, the file is not there. The redirector redirects A to the server where the data is stored. Each time A requests the file, it goes to B and is redirected to the server, until the server has sent the file back to B, and A is no longer redirected.

The second option is to install a redirector on B that provides A with a shortcut hint to the server storage where the file is located. The first time A requests the file from B, A is redirected to the server, the new location of the file. The shortcut hint also tells A not to look for the file in B anymore. Subsequent requests for the file will go directly to the server, eliminating B as the middleman. When the file is returned to B by the server (e.g., when B no longer needs the overflow storage), the server is installed with a redirector and shortcut hint to B. Thus, the next time A requests the file from the server, and the file is not there, A is redirected to B and knows: that on subsequent requests it should go directly to B, the new location of the file.

Figure 4:
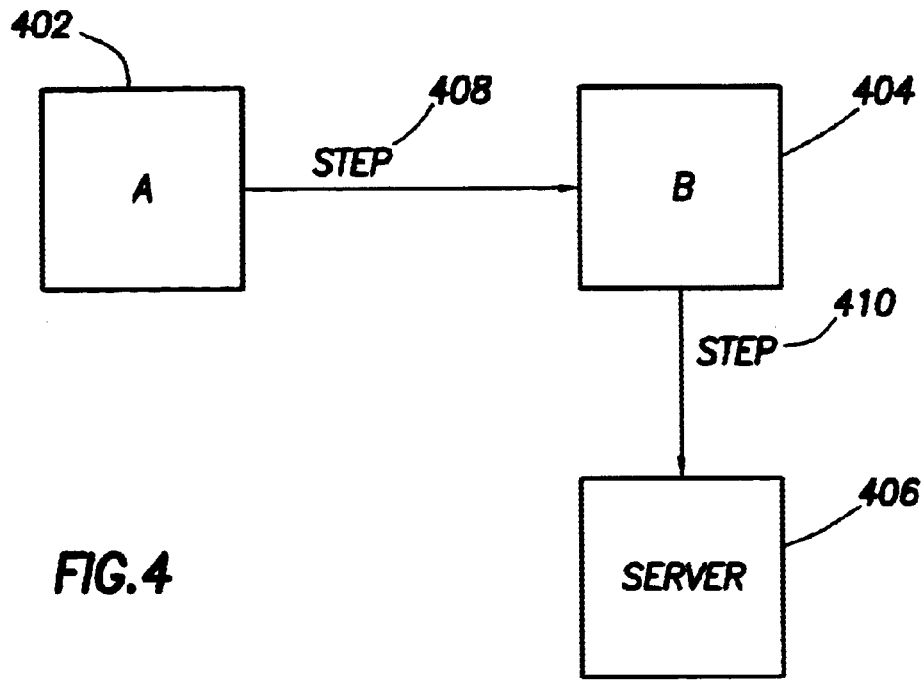
FIGS. 4 and 5 show two methods of redirecting a machine to a file.
Figure 5:
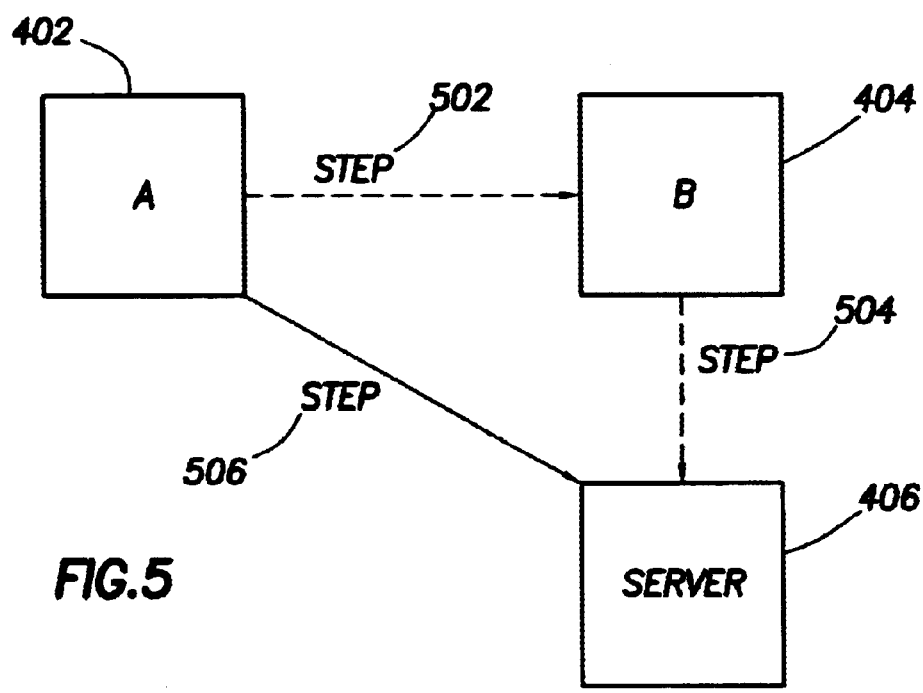

FIGS. 4 and 5 show the two methods of redirecting with or without a shortcut hint. FIG. 4 shows machine A 402, machine B 404 and the server 406 discussed above. In step 408, machine A 402 requests a file from B 404. The request is redirected (step 410) to the server. Subsequent requests follow this same pattern. FIG. 5 shows the process when a shortcut hint is installed with the redirector. The first time A 402 makes a request (step 502) for a file from B 404, the request must be redirected (step 504). However, A 402 is provided with a shortcut hint at that time, so that subsequent requests (step 506) for the needed file go directly from A 402 to the server 406.

Next consider where the file pages will be cached. They can be cached on the server cache, locally in B's cache, or locally in A's cache. If the file pages are cached in B, then a read only cache will allow for less maintenance and unnecessary file copying, because A will not be able to write to the cache. A web server, which is typically read only, could use such a read only cache.

Redirecting occurs on a logical, not a physical, level. Block redirection does not occur. The machines looking for a file are told where to look based on filenames, not physical locations on any given hard disk or other storage device.

Redundant caching can also be implemented. For example, if the primary cache is on machine B, and B then becomes unavailable for some reason, the server can maintain a read only copy of the file pages cached on B. This will allow A to access the server's cache when it cannot access B's cache.

Data selection Algorithms

In an alternate embodiment, rather than transferring the least-recently used data, the PC (or workstation, etc.) chooses the data to be transferred based on the frequency with which that data has been accessed. The PC moves the data which is least frequently used or accessed by the PC. Other selection algorithms can also be used, such as first-in-first-out, frequency based access, time based access, or combinations of multiple algorithms.

Alternative Embodiment: PC User Notified

In an alternate embodiment, the PC (or workstation, etc.) notifies the PC user that data is being transferred from the PC hard drive to a network hard drive. In this embodiment, rather than automatically transferring data without notice, the PC notifies the PC user that the storage is nearing capacity and that data needs to be transferred from the PC storage to network storage. The PC user could either be provided merely with this notice or the PC user could also be prompted to make a choice about how to proceed. The PC user could then choose from several options. One of these options would allow the PC to transfer data based on some predetermined default which would include how to determine the amount of data to transfer and which data to transfer. Another option would allow the user to choose whether least-frequently used data or least-recently accessed data would be transferred. Another option would allow the user to determine the amount of data transferred. One other option would allow the user to actually choose which specific data files would be transferred. However, as will be obvious to those skilled in the art, not all of these options need be presented to the PC user in this embodiment. In fact the options could include other options or any combination of these and other options.

Alternative Embodiment: Network Administrator Notified

In an alternate embodiment, the PC notifies the network administrator. This can be merely notification or it can also provide alternatives for the network administrator to choose from similar to the options given to the PC user in the previously described embodiment.

Alternative Embodiment: Network Server Performs Inspection and Data Transfer In an alternative embodiment, the network server, rather than the local PC, performs inspections of the PC hard drives and transfers the selected data to the network server's storage.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. As will be obvious to those skilled in the art, the type of network or connections chosen is irrelevant to the application of this method.

In one contemplated class of alternative embodiments, access restrictions migrate with the data. For example, if the data was only accessible to a limited number of users prior to transfer, those users will still be the only users allowed access after transfer. Similarly, the users with privileges to alter or delete the data or with other privileges prior to transfer will have those same privileges after transfer. Users without certain privileges will not gain those privileges after transfer. This can be implemented in some operating systems by using Access Control Lists which are associated with the particular files, regardless of their physical location.

Preferably the presence of the transferred data on the network drive is not concealed. However, in another contemplated embodiment, the transferred data cannot be seen by other users in the network storage. That is, the transfer is made completely invisible to everyone except network administrators and workstation users with the appropriate privilege level (which may include the normal workstation user, or may be limited to those with ADMIN privileges on that workstation).

In another contemplated alternative embodiment, the storage on the network drive is compressed, even if storage on the local disk drive is not. This provides more efficient storage of what is, by hypothesis, infrequently used data. Compression can actually speed the data transfer rate, particularly if the server includes dedicated hardware for on-the-fly compression and decompression.

Preferably file delete requests are captured in the local workstation and redirected to the server. However, in one contemplated alternative embodiment, the server also periodically runs a process which checks, for each block of transparently-overflowed data, to see whether the original user's workstation is still connected to the server and still regards that data as active. This helps to avoid long-term accumulation of useless data.

In a further alternative embodiment, transparently-overflowed data which has not been accessed at all within some reasonable period of time (e.g. a year) can be automatically transferred to off-line storage, or even archived, and then deleted from local storage. (Optionally the user can be given a warning message before such action is taken.)

It should also be noted that the disclosed innovative ideas are not limited only to Windows, DOS or UNIX systems, but can also be implemented in other operating systems.

It should also be noted that, over time, an increasing number of functions tend to be combined into a single chip. The disclosed inventions can still be advantageous even with different allocations of functions among chips, as long as the functional principles of operation described above are still observed.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

What is claimed is:

1. A computer system, comprising:
    a server, having a plurality of storage devices attached, connected to a plurality of workstations including first and second workstations, each having storage, to form a network;

wherein when said storage of the first workstation is full enough to meet a fullness test, selected data from said storage is automatically moved to one of said plurality of storage devices attached to said server;

wherein the second workstation is provided with an indication of the location of said selected data thereby permitting said second workstation to access said selected data without interacting with said first workstation;

wherein said fullness test includes a first threshold and a second threshold and when the storage of the first workstation reaches the first threshold, the selected data is moved, but not until it is convenient to move the selected data, and when the storage of the first workstation reaches the second threshold, the selected data is moved immediately.

2. The computer system of claim 1, wherein the amount of said selected data moved is more than enough to ensure said fullness test is not met.

3. The computer system of claim 1, wherein said fullness test compares the available percentage of capacity of said storage to a predetermined threshold.

4. The computer system of claim 1, wherein said selected data is chosen based on an algorithm selected from the group consisting of: least recent use; least frequent use; and first in first out.

5. The computer system of claim 1, wherein at least one of said workstations is a personal computer.

6. The computer system of claim 1, wherein at least one of said workstations is an electronic appliance.

7. The computer system of claim 1, wherein at least one of said workstations is an internet appliance.

8. The computer system of claim 1, wherein the user of a said workstation is not notified that said selected data is moved.

9. A method of operating a network, comprising the steps of:

(a.) monitoring the usage of storage in computers connected to said network;

(b.) when said storage in any one of said computers meets a fullness test, automatically moving selected data from said storage to different storage in another computer attached to said network; and (c.) providing information to another computer indicating the location of said selected data thereby permitting said other computer to access said selected data without interacting the computer that met the fullness test;

wherein said fullness test includes two thresholds, one of which is associated with moving the selected data at a convenient time and the other threshold is associated with moving the selected data immediately.

10. The method of claim 9, wherein said fullness test compares the available percentage of capacity of said storage to a predetermined threshold.

11. The method of claim 9, wherein the amount of said selected data moved is more than enough to ensure said fullness test is not met.

12. The method of claim 9, wherein at least one of said computers is a personal computer.

13. The method of claim 9, wherein at least one of said computers is a server.

14. The method of claim 9, wherein the user of a said computers is not notified that said selected data is moved.

15. A method of storing data on a network of computers comprising a plurality of computers, each computer having storage attached, wherein the computers are connected to form a network, comprising the steps of:

(a.) periodically inspecting said computer storage to determine if a fullness test has been met;

(b.) if said fullness test has been met, then selecting data from said storage;

(c.) moving said selected data to said storage of another said computer of said plurality; and (d.) providing information to another computer indicating the location of said selected data thereby permitting said other computer to access said selected data without interacting the computer that met the fullness test;

wherein a user of said computer is not notified that said selected data has been moved; and wherein said fullness test includes two thresholds, one of which is associated with moving the selected data at a convenient time and the other threshold is associated with moving the selected data immediately.

16. The method of claim 15, wherein a network administrator that monitors said network is not notified that said selected data has been moved.

17. The method of claim 15, wherein said fullness test compares the available percentage of capacity of said storage to a predetermined threshold.

18. The method of claim 15, wherein the amount of said selected data moved is more than enough to ensure said fullness test is not met.

19. The method of claim 15, wherein said selected data is selected based on least recent use of said data.

20. The method of claim 15, wherein said selected data is selected based on least frequent use of said data.

21. The method of claim 15, wherein said computers each inspect their own said storage, select said selected data, and move said selected data.

22. The method of claim 15, wherein at least one of said computers is a server.

23. A computer system, comprising:

a plurality of computers, each computer having storage attached, wherein the computers are connected to form a network, each of said computers having first and second thresholds of storage fullness;

wherein when said storage on a said computer reaches said first threshold, selected data from said storage is automatically moved to the storage on another said computer, said selected data being moved at a time when it is efficient use of network resources; and wherein when said storage on a said computer reaches said second threshold, selected data from said storage is automatically moved to the storage on another said computer, said selected data being moved immediately.

24. The computer system of claim 23, wherein at least one of said computers is a server.

25. The computer system of claim 23, wherein the amount of said selected data moved is greater than the amount of data above said first predetermined threshold.

26. The computer system of claim 23, wherein the amount of said selected data moved is greater than the amount of data above said second predetermined threshold.

27. The computer system of claim 23, wherein a user of a said computer is not notified that said selected data is moved.

* * * * *